US 6,181,934 B1

(12) United States Patent
Havinis et al.

(10) Patent No.: US 6,181,934 B1
(45) Date of Patent: Jan. 30, 2001

(54) SYSTEM AND METHOD FOR PROVIDING EFFICIENT SIGNALING FOR A POSITIONING REQUEST AND AN INDICATION OF WHEN A MOBILE STATION BECOMES AVAILABLE FOR LOCATION SERVICES

(75) Inventors: Theodore Havinis, Plano; Dimitris Papadimitriou, Dallas, both of TX (US)

(73) Assignee: Ericsson Inc., Research Triangle Park, NC (US)

( * ) Notice: Under 35 U.S.C. 154(b), the term of this patent shall be extended for 0 days.

(21) Appl. No.: 09/191,811

(22) Filed: Nov. 13, 1998

(51) Int. Cl.[7] .................................................. H04Q 7/20
(52) U.S. Cl. ......................... 455/432; 455/445; 455/458; 455/433; 455/435
(58) Field of Search .................................... 455/432, 445, 455/433, 435, 458, 456, 434

(56) References Cited

U.S. PATENT DOCUMENTS 5,878,347 * 3/1999 Joensuu et al. ...................... 455/433

FOREIGN PATENT DOCUMENTS 0 720 406 A2   7/1996 (EP) .
WO 96/25830   8/1996 (WO) .

* cited by examiner

Primary Examiner—Thanh Cong Le
Assistant Examiner—Lana Le
(74) Attorney, Agent, or Firm—Jenkens & Gilchrist, P.C.

(57) ABSTRACT

A telecommunications system and method is disclosed for reducing the unnecessary signaling for positioning requests involving a Mobile Station (MS) when that MS does not respond to paging requests or is purged from the network, e.g., not registered with a Mobile Switching Center/Visitor Location Register. When a positioning request for a particular MS is received at a serving MSC and the MS does not respond to a paging request, the serving MSC sets a "Subscriber Not Responding to Location Services" (SNRLS) flag, which is used by the serving MSC to avoid unnecessarily sending a new paging request for the same MS. In addition, the serving MSC sends a rejection message to a Gateway Mobile Location Center (GMLC) that sent the positioning request, which includes an unavailable notification indicating that the MS cannot be reached. The GMLC sets an "MS Subscriber Not Present" flag based upon this notification to avoid sending further positioning requests for that MS.

24 Claims, 7 Drawing Sheets

SYSTEM AND METHOD FOR PROVIDING EFFICIENT SIGNALING FOR A POSITIONING REQUEST AND AN INDICATION OF WHEN A MOBILE STATION BECOMES AVAILABLE FOR LOCATION SERVICES

BACKGROUND OF THE PRESENT INVENTION

FIELD OF THE INVENTION

The present invention relates generally to telecommunications systems and methods for positioning a mobile station within a wireless telecommunications system, and particularly to providing efficient signaling and an indication of when a mobile station becomes available for a positioning request.

BACKGROUND AND OBJECTS OF THE PRESENT INVENTION

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

The VLR 16 is a database containing information about all of the MS's 20 currently located within the MSC/VLR area 12. If an MS 20 roams into a new MSC/VLR area 12, the VLR 16 connected to that MSC 14 requests data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS 20 within a cellular network 10 has recently become important for a wide range of applications. For example, positioning services may be used by transport and taxi companies to determine the location of their vehicles. In addition, for emergency calls, e.g., 911 calls, the exact location of the MS 20 may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital, e.g., "Where am I" service.

As can be seen in FIG. 2 of the drawings, upon a network positioning request, the Base Station System (BSS) (23 and 24) serving the MS 20 to be positioned generates positioning data, which is delivered to the MSC/VLR 14. This positioning data is forwarded to a positioning gateway, e.g., for GSM systems, this is referred to as a Mobile Location Center (MLC) 270, for calculation of the geographical location of the MS 20. The location of the MS 20 can then be sent to a Location Application (LA) 280 that requested the positioning. Alternatively, the requesting LA 280 could be located within the MS 20 itself, within the MSC/VLR 14 or could be an external node, such as an Intelligent Network (IN) node.

In order to accurately determine the location of the MS 20, positioning data from three or more separate BTS's (24a, 24b, and 24c) is required. This positioning data for GSM systems can include, for example, a Timing Advance (TA) value, which corresponds to the amount of time in advance that the MS 20 must send a message in order for the BTS 24 to receive it in the time slot allocated to that MS 20. When a message is sent from the MS 20 to the BTS 24, there is a propagation delay, which depends upon the distance between the MS 20 and the BTS 24. TA values are expressed in bit periods, and can range from 0 to 63, with each bit period corresponding to approximately 550 meters between the MS 20 and the BTS 24.

Once a TA value is determined for one BTS 24, the distance between the MS 20 and that particular BTS 24 is known, but the actual location is not. If, for example, the TA value equals one, the MS 20 could be anywhere along a radius of 550 meters. Two TA values from two BTSs, for example, BTSs 24a and 24b, provide two possible points that the MS 20 could be located (where the two radiuses intersect). However, with three TA values from three BTSs, e.g., BTSs 24a, 24b, and 24c, the location of the MS 20 can be determined with a certain degree of accuracy. Using a triangulation algorithm, with knowledge of the three TA values and site location data associated with each BTS (24a, 24b, and 24c), the position of the MS 20 can be determined (with certain accuracy) by the MLC 270.

It should be understood, however, that any estimate of time, distance, or angle for any cellular system 10 can be used, instead of the TA value discussed herein. For example, the MS 20 can have a Global Positioning System (GPS) receiver built into it, which is used to determine the location of the MS 20. In addition, the MS 20 can collect positioning data based on the Observed Time Difference (OTD) between the time a BTS 24 sends out a signal and the time the MS 20 receives the signal. This time difference information can be sent to the MLC 270 for calculation of the location of the MS 20. Alternatively, the MS 20, with knowledge of the location of the BTS 24, can determine its own location.

As positioning services become more available, many wireless service providers may offer subscriptions for location services to LAs 280. With a subscription, a location application profile is created for the LA 280 in a positioning gateway (not shown) serving the LA 280. For GSM systems, the positioning gateway is called a Gateway Mobile Location Center (GMLC). In order to use the service, the LA 280 will need to send a positioning request for a specific MS 20 to the positioning gateway or GMLC. The GMLC can determine the serving MSC/VLR 14 of the specific MS 20 and forward the positioning request to the MSC/VLR 14, which can then page the MS 20 and forward the positioning request to the MLC 270 associated with the serving MSC/VLR 14.

However, in some circumstances, the HLR (shown as 26 in FIG. 1) may determine that the MS 20 has been purged from the MSC/VLR 14 records, e.g., the MS 20 is not registered with any MSC/VLR 14. In addition, even if the MS 20 is registered with the serving MSC/VLR 14, the MS 20 may not respond to the page, which can occur, for example, when the MS 20 has been deactivated, e.g., the power has been turned off. In these situations, the geographical position of the MS 20 cannot be obtained, and a rejection message is sent to the requesting LA 280.

Unfortunately, this rejection message may not deter the requesting LA 280 from sending future positioning requests for the MS 20, because the requesting LA 280 has no knowledge of when the MS 20 will become available. Furthermore, additional requesting LA's (not shown) will have no knowledge of the failed positioning request, and thus, these additional requesting LA's will each send their respective positioning requests. If the MS 20 has not yet become available, e.g., the MS 20 has not reregistered with an MSC/VLR 14 or the MS 20 has not responded to any pages, rejection messages will continue to be sent to all of these requesting LAs 280.

Therefore, during the time that the MS 20 is not able to be reached, numerous signaling messages between the GMLC and the HLR 26, the GMLC and the serving MSC/VLR 14 and the serving MSC/VLR 14 and the MS 20 can occur for numerous positioning requests. All of this unnecessary signaling increases the signaling traffic on the network and reduces the network efficiency.

It is, therefore, an object of the present invention to reduce the unnecessary signaling caused by a positioning request for a mobile station that is unable to be positioned.

It is still a further object of the present invention to provide an indication of when a mobile station becomes available for a positioning request.

SUMMARY OF THE INVENTION

The present invention is directed to telecommunications systems and methods for reducing the unnecessary signaling caused by a positioning request for an MS when that MS does not respond to paging requests or is purged from the network, e.g., not registered with an MSC/VLR. When a positioning request for a particular MS is received at the serving MSC/VLR from a GMLC and the MS does not respond to the paging request, the serving MSC/VLR sets a "Subscriber Not Responding to Location Services" (SNRLS) flag, which is used by the serving MSC/VLR to avoid unnecessarily sending a new paging request for the same MS. In addition, the serving MSC/VLR sends a rejection message to the GMLC, which includes an unavailable notification indicating that the MS cannot be reached. The GMLC sets an "MS Subscriber Not Present" flag based upon this notification to avoid sending further positioning requests for that MS as long as the MS is not able to be reached. Alternatively, when the positioning request is received at the HLR from the GMLC and the HLR determines that the MS has been "purged," the HLR sends the rejection message and the unavailable notification to the GMLC, which can use this notification to set the flag. Once the MS attaches to the network by either engaging in a transaction or performing a location update, the SNRLS flag in the MSC/VLR is reset and an available notification message is sent to the GMLC from the MSC/VLR, which clears the "MS Subscriber Not Present" flag. Alternatively, if the MS purge flag is reset in the HLR, the HLR sends the available notification message to the GMLC. Finally, the GMLC may optionally inform the specific LA that had previously sent the positioning request that the MS is now available.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
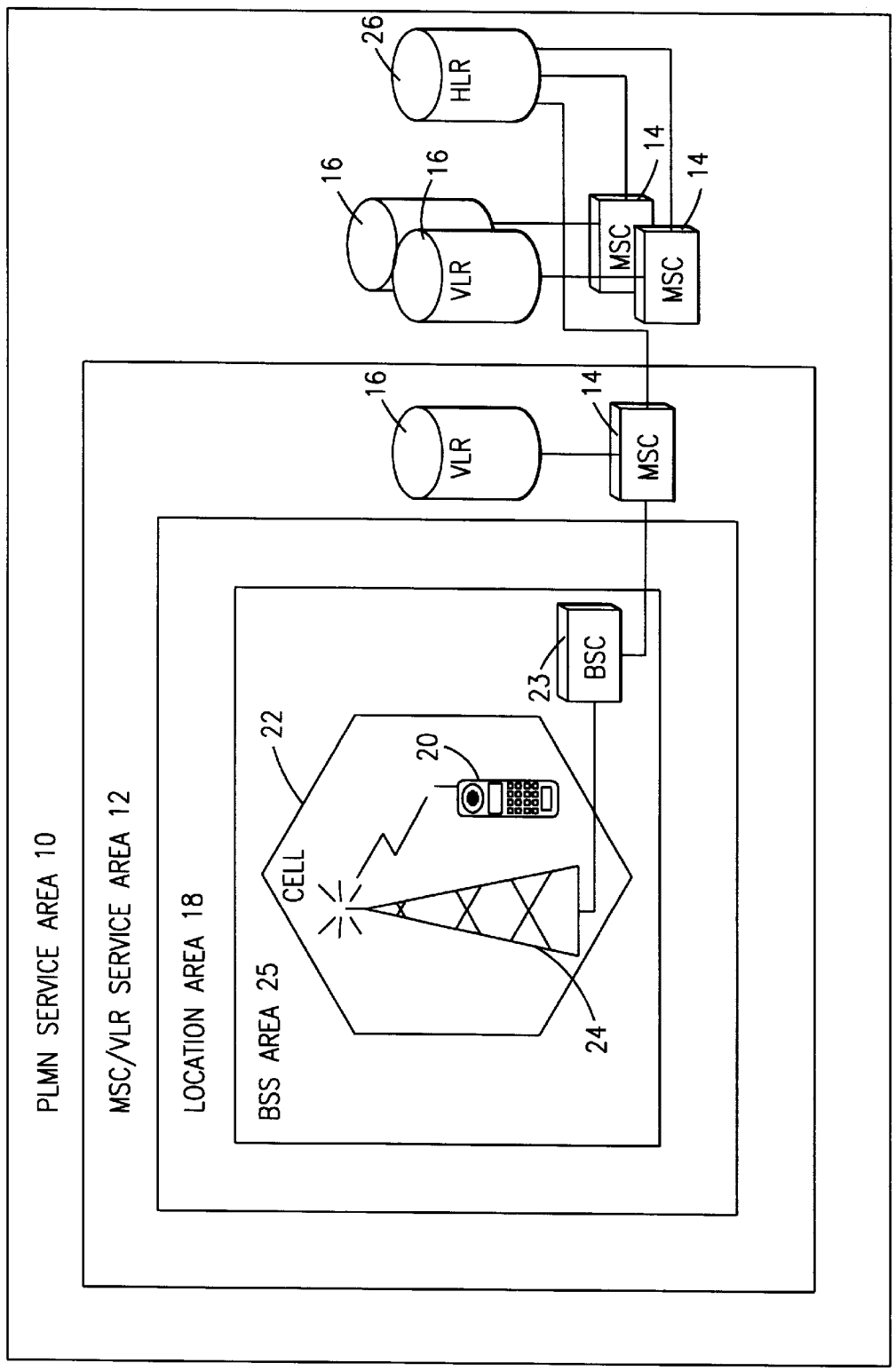
FIG. 1 is block diagram of a conventional wireless telecommunications system.
Figure 2:
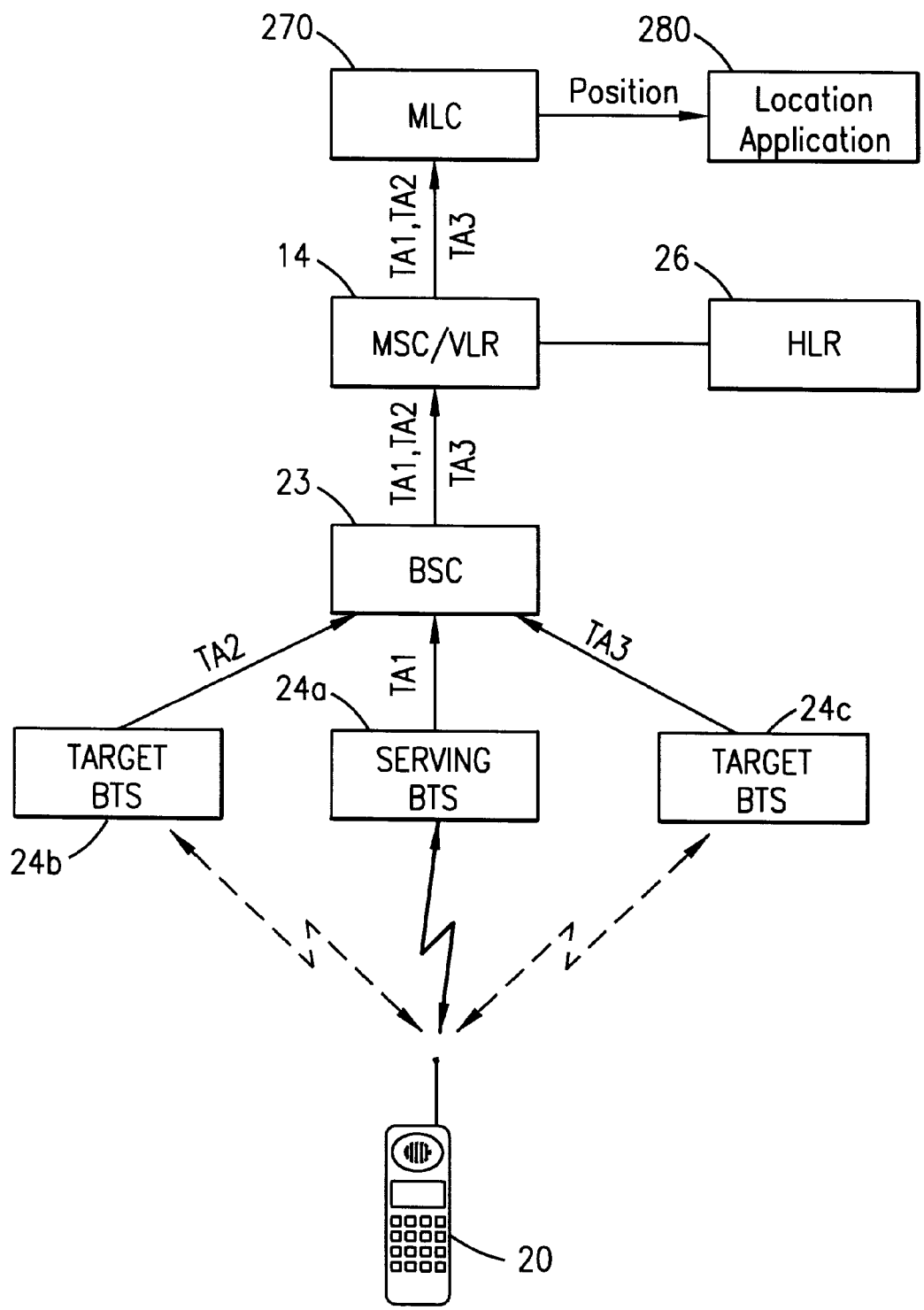
FIG. 2 illustrates a sample conventional positioning of a mobile station in which positioning data is acquired and transmitted to a mobile location center to determine the location of that mobile station.
Figure 3:
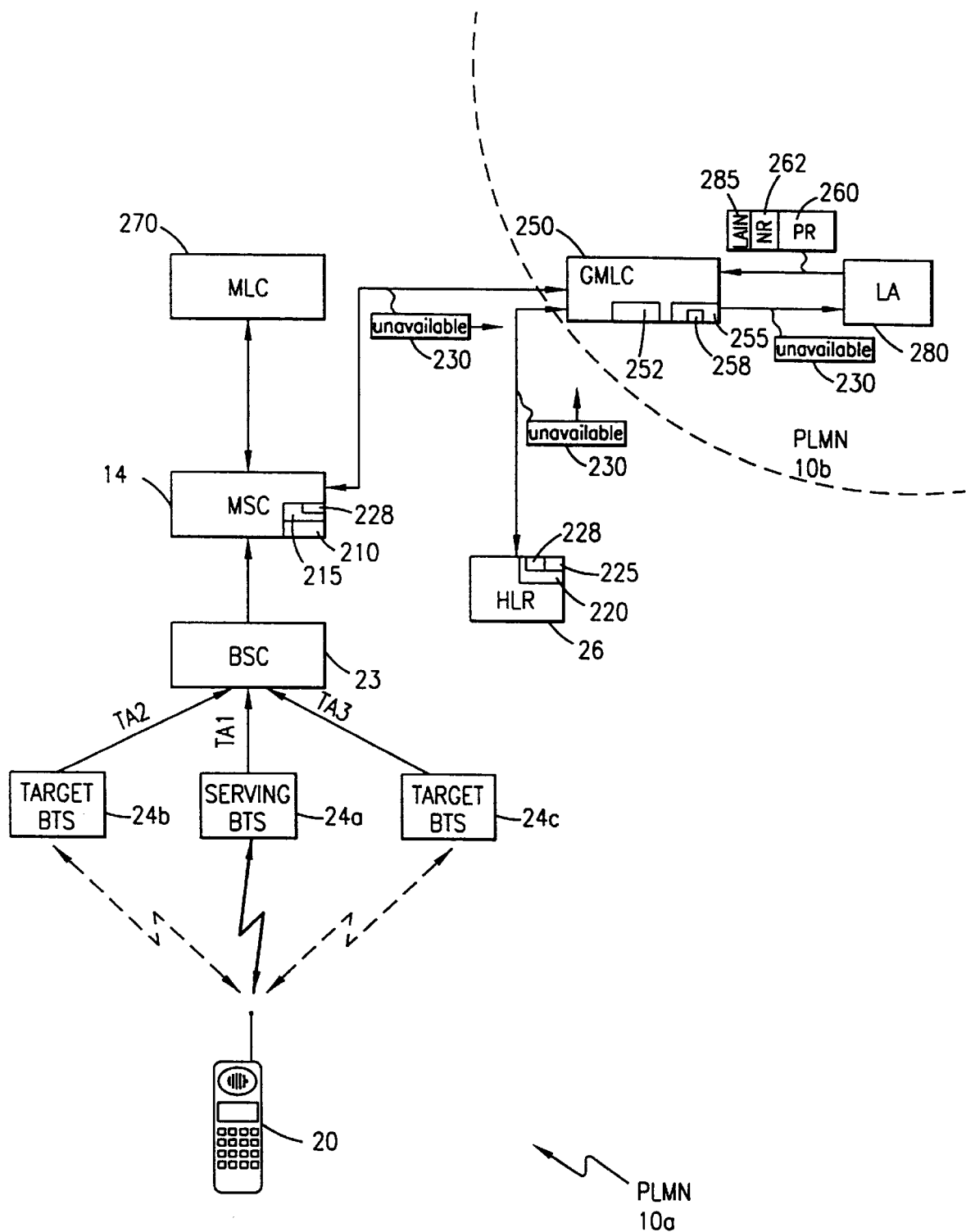
FIG. 3 illustrates the routing of a positioning request for a mobile station that is purged or unavailable in accordance with preferred embodiments of the present invention.

With reference now to FIG. 3 of the drawings, prior to sending a positioning request, a Location Application (LA) 280 must first register with a positioning gateway, e.g., for GSM networks, a Gateway Mobile Location Center (GMLC) 250, and define within, for example, a database 255 within the GMLC 250 its location services profile 258, e.g., all of the relevant service parameters specific to that LA 280. For example, the LA 280 can define whether the LA 280 has the authority to override privacy settings of all subscribers, as in the case of an emergency center, or particular subscribers, as in the case of a law enforcement agency. Furthermore, the LA 280 can define whether the LA 280 is associated with a group of subscribers, e.g., a fleet management company, and the particular Mobile Station International Subscriber Directory Number's (MSISDN's) associated with that group. The MSISDN is the digit string associated with a particular Mobile Station (MS) 20.

Figure 4A:
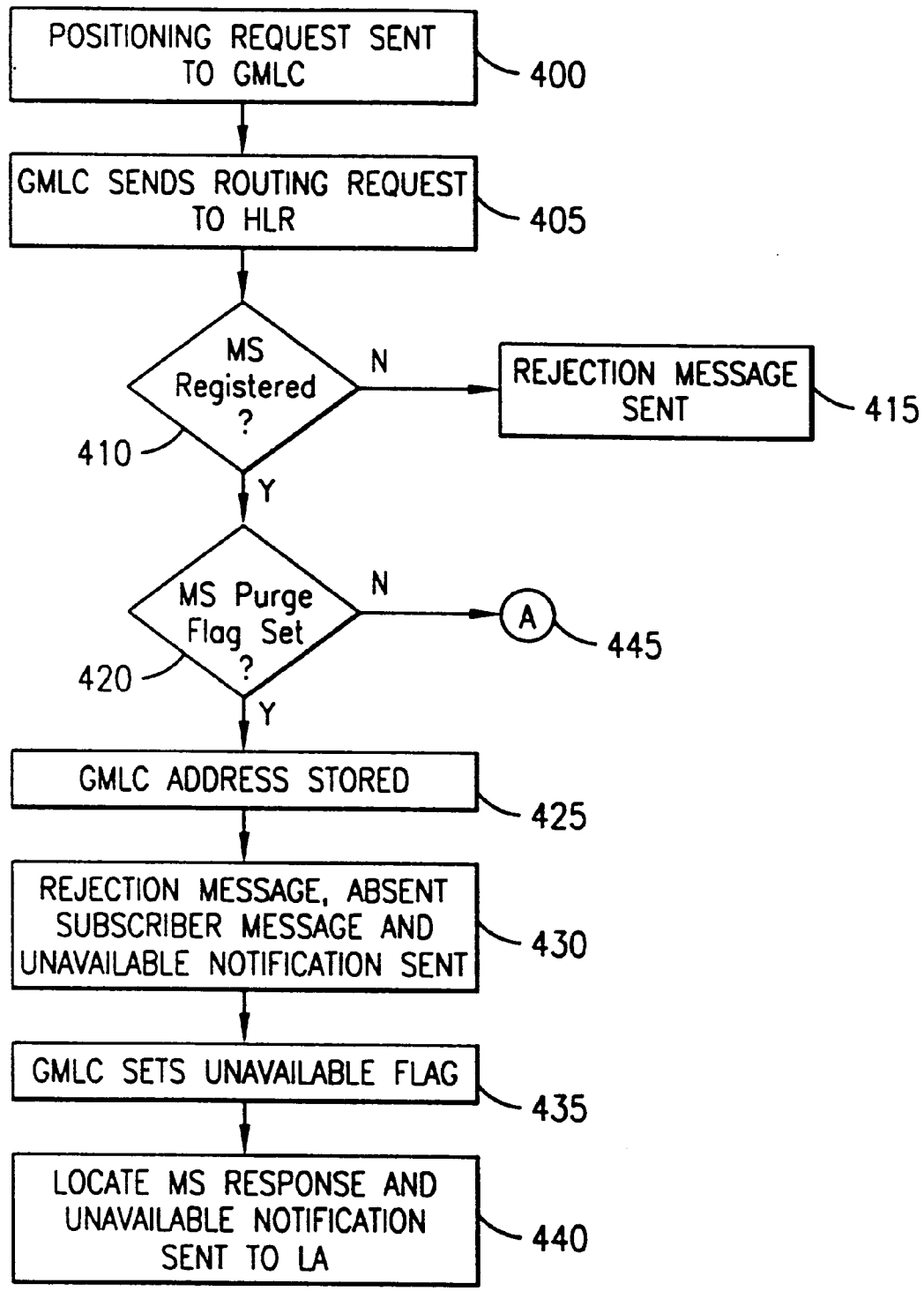
FIGS. 4A and 4B illustrate the steps in the routing of a positioning request for a mobile station that is purged or unavailable in accordance with preferred embodiments of the present invention.

Once the LA 280 has defined the service parameters 258 specific to that LA 280, the GMLC 250 assigns a Location Application Identifier Number (LAIN) 285, which identifies the particular LA 280 and the associated service parameters 258. Thereafter, as shown in FIG. 4A of the drawings, the requesting LA 280 can send its LAIN 285 in a positioning request 260 for a particular MS 20 or a group of MS's 20 to the GMLC 250, which is the GMLC 250 for the Public Land Mobile Network (PLMN) 10b that the LA 280 is in (step 400). When an LA 280 terminates its location subscription with the wireless service provider, the location application profile 258 assigned to the LA 280 is removed from the database 255 within the GMLC 250.

After the GMLC 250 receives the positioning request 260 along with the associated LAIN 285 from the LA 280 and determines that the LAIN 285 of the LA 280 is registered with the GMLC 250 (step 400), the GMLC 250 can then send a request for routing information (step 405), e.g., the address of the Mobile Switching Center/Visitor Location Register, hereinafter referred to as the Mobile Switching Center (MSC) 14, to the MS's 20 Home Location Register (HLR) 26, using the MS's 20 directory number as a global title. The signaling network, e.g., the Signaling System #7 (SS7) network (not shown), can perform a global title translation on the International Mobile Station Identity (IMSI) number associated with the MS 20 and route the request to the appropriate HLR 26 for the MS 20.

The HLR 26 then checks a subscriber record 220 associated with the MS 20 to confirm that the MS 20 is registered in the HLR 26 (step 410), and that an MS purge flag 225 has not been set (step 420). The MS purge flag 225 indicates whether the MS 20 has been purged from the MSC 14 records. If the MS 20 is not registered in the HLR 26 (step 410), the HLR 26 sends a rejection message to the GMLC 250 (step 415) indicating "Unknown Subscriber." If the MS 20 is registered (step 410), but the purge flag 225 is set (step 420), in order to reduce the unnecessary signaling for requesting location information when the MS 20 has been purged, the HLR 26 stores an address 228 of the requesting GMLC 250 in the MS subscriber record 220 (step 425) and sends a rejection message along with both an "Absent Subscriber" message and an unavailable notification 230 to the GMLC 250 (step 430) indicating that the MS 20 is not able to be positioned. The GMLC 250 sets a "MS Subscriber Not Present" flag 252 (step 435) based upon this notification 230 to avoid sending further requests for location information to the HLR 26 as long as the MS 20 is purged. If the LA 280 positioning request 260 included a request 262 to be notified when the MS 20 is not able to be positioned, then the GMLC stores the LAIN 285 of the LA 280 and the notification request 262 in a memory therein, such as the location services profile 258, and includes this unavailable notification 230 in a "Locate MS Response" sent from the GMLC 250 to the LA 280 (step 440).

Figure 4B:
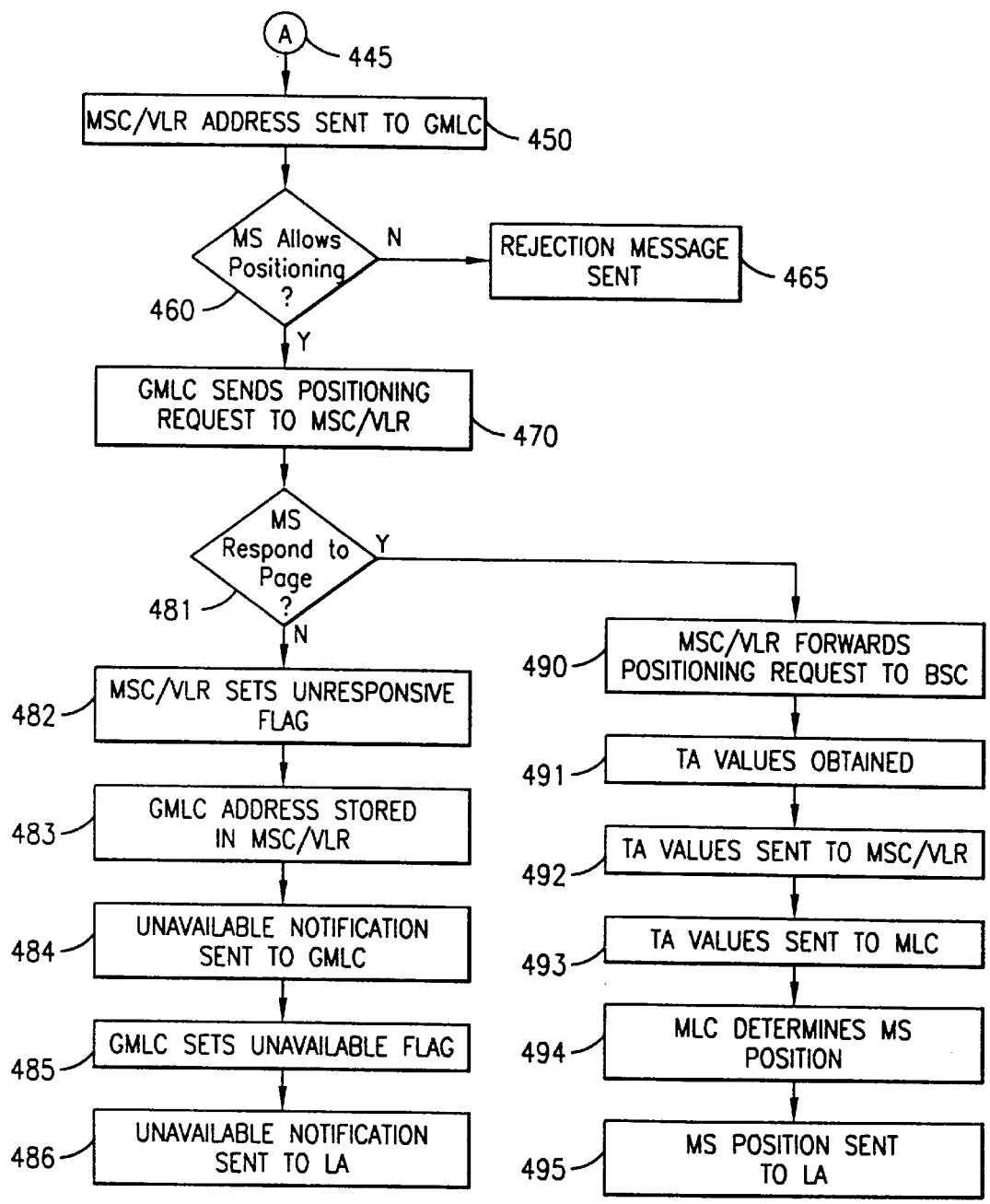

However, with reference now to FIG. 4B of the drawings, if the MS 20 purge flag is not set (steps 420 and 445), the routing information, e.g., the serving MSC 14 address, is sent to the GMLC 250 (step 450). The GMLC 250 verifies that the subscriber or MSISDN associated with the MS 20 to be positioned by the LA 280 allows positioning to be performed (step 460), by checking the positioning subscription information, e.g., privacy indication, sent by the HLR 26. Alternatively, the serving MSC 14 or serving Mobile Location Center (MLC) 270 can check the privacy indication of the MSISDN. However, if, for example, the LA 280 is an emergency center or a law enforcement agency, the LA 280 can define its location services 258 such that the privacy indications established by the subscriber can be overridden to perform positioning. In this case, the GMLC 250 does not check the privacy indications of the MSISDN. If the MSC 14 normally performs the check, the privacy override indication is passed onto the MSC 14 from the GMLC 250 along with the positioning request 260. It should be noted that other service parameters (either defined originally by the LA 280 or sent with the positioning request 260) can also be passed onto additional nodes during the positioning process.

If the MSISDN associated with the MS 20 to be positioned does not allow positioning (step 460), the positioning request 260 is rejected and a rejection message is sent to the LA 280 (step 465). However, if the MSISDN does allow positioning (step 460), the GMLC 250 sends the positioning request 260 to the serving MSC 14 (step 470) in the PLMN 10a of the MS 20, using the MSC 14 address.

Once the positioning request 260 is received by serving MSC 14 (step 470), if the MS 20 is in idle mode, the serving MSC 14 must page the MS 20 and setup a call to the MS 20. This call does not activate the ringing tone on the MS 300, and therefore, is not noticed by the MS 300.

If the MS 20 does not respond to the paging request (step 481), the MSC 14 sets a "Subscriber Not Responding to Location Services" (SNRLS) flag 210 (step 482), which prevents the MSC 14 from unnecessarily sending a new paging request for the same MS 20. The MSC 14 stores the address 228 of the requesting GMLC 250 in a memory therein (step 483), such as the MS subscriber record 215, and sends an unavailable notification 230 in, for example, the existing MAP procedure PROVIDE SUBSCRIBER LOCATION ACKNOWLEDGMENT, to the GMLC 250 (step 484) indicating that the MS 20 is not able to be positioned. The GMLC 250 sets a "MS Subscriber Not Present" flag 252 (step 485) based upon this unavailable notification 230 to avoid sending further requests for location information to the MSC 14 as long as the MS 20 is not able to be positioned. If the LA 280 positioning request 260 included a request to be notified when the MS 20 is not able to be positioned, then the "Locate MS Response" sent from the GMLC 250 to the LA 280 includes this unavailable notification 230 (step 486).

However, if the MS 20 does respond to the page (step 481), the serving MSC 14 forwards the positioning request 260 to a Base Station Controller (BSC) 23 (step 490), which determines a serving Base Transceiver Station (BTS) 24a, and obtains a Timing Advance (TA) value (TA1), or other positioning data, from this serving BTS 24a, if possible.

Thereafter, TA values are obtained from at least two target BTSs (24*b* and 24*c*) (step 491) by performing a positioning handover. If the serving BTS 24*a* does not support positioning, an additional target BTS (not shown) must be selected. It should be noted that other positioning methods can be used instead of obtaining TA values, as discussed herein. In addition, positioning of the MS 20 can be performed using more than three BTSs (24*a*, 24*b*, and 24*c*).

The TA values (TA1, TA2 and TA3) are then transmitted by the serving BSC 23 to the MSC 14 (step 492). Finally, the TA values (TA1, TA2 and TA3) are forwarded to the serving MLC 270 from the MSC 14 (step 493), where the location of the MS 20 is determined using the triangulation algorithm (step 494). The MLC 270 then presents the geographical position of the MS 20 to the requesting LA (node) 280 (step 495).

Figure 5:
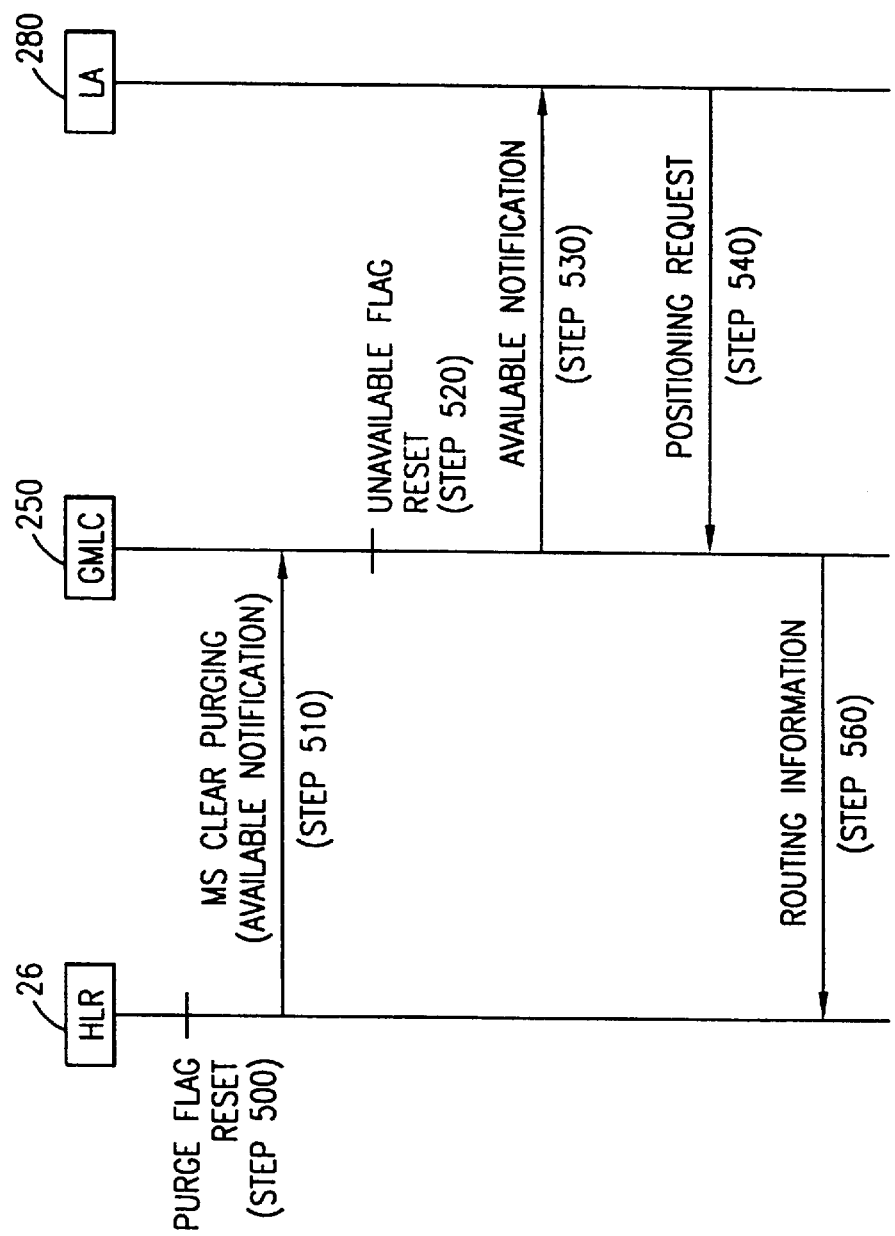
FIG. 5 illustrates the providing of an available notification to a gateway mobile location center when a mobile station is no longer purged in accordance with embodiments of the present invention.

With reference now to FIG. 5 of the drawings, if the MS purge flag 225 was set in the HLR 26 and the MS purge flag 225 is reset (as a result of a location update by the MS 20) (step 500) indicating that the MS 20 is now registered with the serving MSC 14, an available notification (step 510) indicating that the MS 20 subscriber is registered is sent to the GMLC 250 in, for example, a new MAP message "MS Clear Purging." This available notification clears the "MS Subscriber Not Present" flag at the GMLC 250 (step 520). In addition, the GMLC 250 may optionally inform the specific LA 280 that had previously sent the positioning request 260 that the MS 20 is now able to be positioned (step 530). Thereafter, the LA 280 can send future positioning requests 260 to the GMLC (step 540), which can then begin the positioning process, e.g., by sending a routing request to the HLR 26 (step 560).

Figure 6:
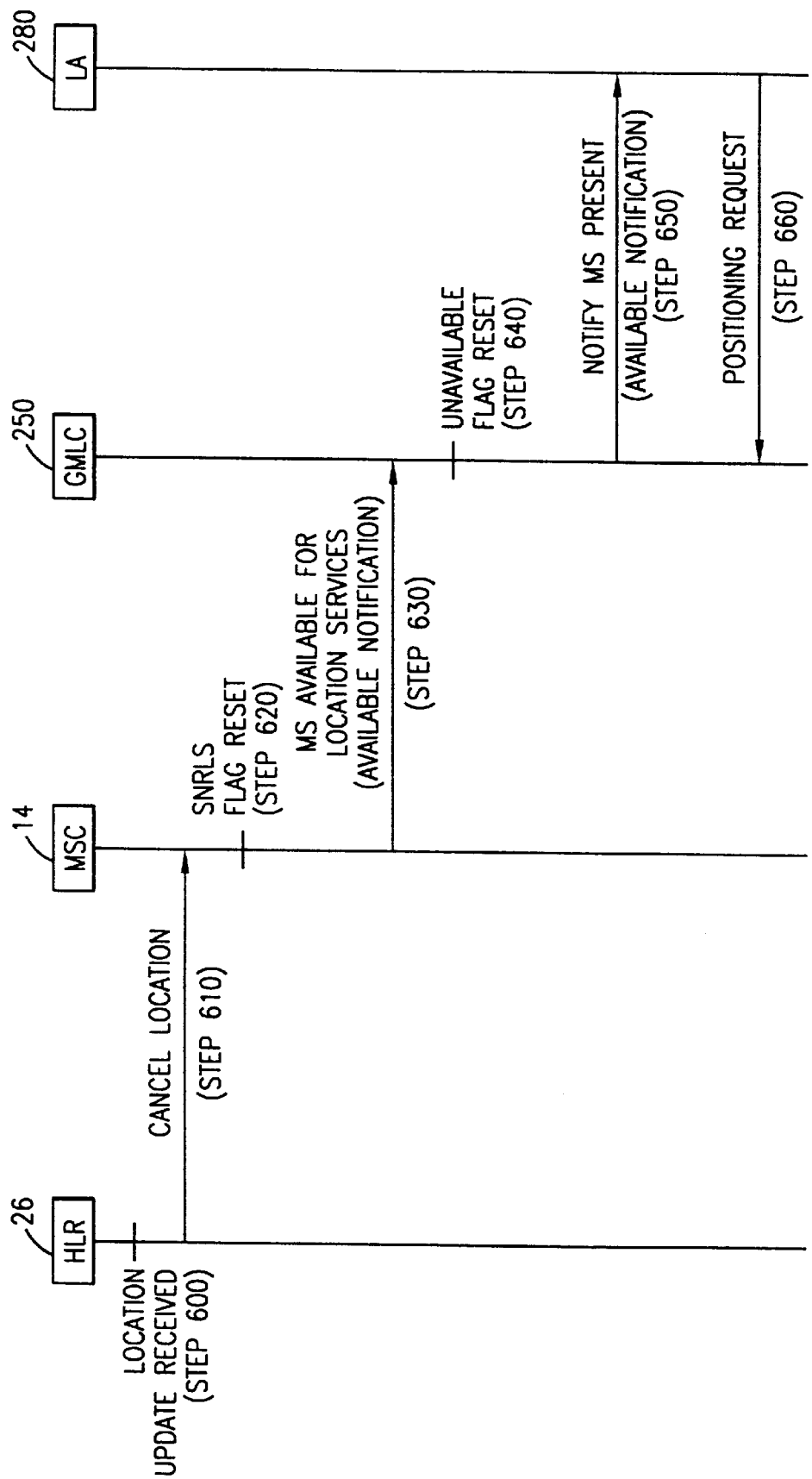
FIG. 6 illustrates the providing of an available notification to a gateway mobile location center when a mobile station becomes available for location services in accordance with embodiments of the present invention.

Alternatively, as shown in FIG. 6 of the drawings, if the MS 20 did not respond to the page, when the MS 20 next attaches to the network, the SNRLS flag 228 is reset in the serving MSC 14, which allows the MSC 14 to send paging requests to the MS 20 for subsequently received positioning requests. The MS 20 can attach to the network by performing a location update to a new MSC (not shown) (step 600), originating its own positioning request or sending or receiving a communication to or from the serving MSC 14, e.g., sending a call setup request, engaging in a call connection or sending or receiving a short message service (SMS) message. If the MS 20 attaches to the network by performing a location update to a new MSC, a MAP "Cancel Location" message is sent to the previously serving MLC/VLR 14 (step 610), which resets the SNRLS flag 228 in the previously serving MSC 14 (step 620).

Once the SNRLS flag 228 is reset, the MSC 14 sends an available notification message is sent to the GMLC 250 (step 630) in, for example, a new MAP message "MS Present for Location Services." This available notification sent to the GMLC 250 clears in the GMLC 250 the flag of "MS Subscriber Not Present" 252 (step 640). Finally, as stated hereinbefore, the GMLC 250 may optionally inform the specific LA 280 that had previously requested location information that the MS 20 is now able to be positioned by sending, for example, a new "Notify MS Present" message to the LA 280 (step 650). The LA 280 cant then send positioning requests 260 to the GMLC 250 for the MS 20 (step 660).

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the location services can be used by applications located-in or connected-to the subscriber's MS, by network applications or by external applications.

In addition, it should be understood that other positioning methods, instead of the Timing Advance positioning method discussed herein, can be used to determine the location of the mobile terminal. For example, such positioning methods can include: Time of Arrival, Angle of Arrival, Global Positioning System, Observed Time Difference, or Enhanced Observed Time Difference.

Furthermore, it should be understood that the positioning systems and methods disclosed herein can be utilized by any cellular network, including, but not limited to the Global System for Mobile Communications (GSM) network, the Personal Communications Systems (PCS) network, the AMPS network and the D-AMPS network.

What is claimed is:

1. A telecommunications system for providing efficient signaling for a positioning request for a mobile station, comprising:

a gateway mobile location center for receiving said positioning request for said mobile station, said gateway mobile location center having an unavailable flag for indicating whether to send a routing request based upon said received positioning request; and a home location register for receiving a routing request from said gateway mobile location center, said home location register having a purge flag therein associated with said mobile station for indicating whether said mobile station is purged, said home location register sending subscriber data associated with said mobile station to said gateway mobile location center in response to said routing request when said purge flag is not set.

2. The telecommunications system of claim 1, wherein said unavailable flag is a "MS Subscriber Not Present" flag.

3. The telecommunications system of claim 1, further comprising a mobile switching center for sending a page to said mobile station in response to receiving said positioning request from said gateway mobile location center, said mobile switching center including an unresponsive flag for indicating whether to send said page to said mobile station based upon said received positioning request.

4. The telecommunications system of claim 3, wherein said unresponsive flag is a "Subscriber Not Responding to Location Services" flag.

5. The telecommunications system of claim 3, wherein said unresponsive flag is reset when said mobile station engages in a communication.

6. The telecommunications system of claim 5, wherein said communication comprises a location update message, a call setup request, a call connection, a short message service message, or a mobile originated positioning request.

7. The telecommunications system of claim 1, further comprising a location node for sending said positioning request to said gateway mobile location center, said positioning request including a notification request instructing said gateway mobile location center to notify said location node when said unavailable flag is set.

8. A method for providing efficient signaling for a positioning request for a mobile station served by a mobile switching center, comprising the steps of:

receiving said positioning request for said mobile station from a sending node;

sending a page to said mobile station based upon said positioning request;

setting an unresponsive flag associated with said mobile station when said mobile station does not respond to said page, said unresponsive flag preventing said mobile switching center from sending additional pages for additional positioning requests for said mobile station to said mobile station as long as said unresponsive flag is set;

storing an address for said sending node when said unresponsive flag is set; and sending an unavailable notification to said sending node when said unresponsive flag is set.

9. The method of claim 8, further comprising the step of:

determining whether said unresponsive flag is set prior to paging said mobile station, said step of paging not being performed when said unresponsive flag is set.

10. The method of claim 8, further comprising the steps of:

resetting said unresponsive flag when said mobile station engages in a communication; and sending an available notification to said sending node when said unresponsive flag is reset.

11. A method for providing efficient signaling for a positioning request for a mobile station, comprising the steps of:

receiving said positioning request for said mobile station from a location node;

sending a routing request to a home location register associated with said mobile station;

receiving an unavailable notification from said home location register when a purge flag associated with mobile station is set; and setting an unavailable flag when said unavailable notification is received.

12. The method of claim 11, wherein said positioning request includes a notification request, and further comprising the steps of:

storing said notification request and an address for said location node; and sending said unavailable notification to said location node based upon said notification request.

13. The method of claim 12, further comprising the steps of:

receiving an available notification from said home location register when said purge flag is reset; and sending said available notification to said location node based upon said notification request.

14. The method of claim 11, further comprising the steps of:

receiving an address for a mobile switching center serving said mobile station when said unavailable notification is not sent by said home location register;

sending said positioning request to a mobile switching center using said address; and receiving said unavailable notification from said mobile switching center when said mobile station does not respond to a page sent from said mobile switching center to said mobile station, said unavailable flag being set based upon said unavailable notification.

15. The method of claim 14, further comprising the step of:

receiving an available notification from said mobile switching center when said mobile station engages in a communication.

16. A method for providing efficient signaling for a positioning request for a mobile station, comprising the steps of:

receiving said positioning request for said mobile station at a gateway mobile location center;

sending a routing request to a home location register storing subscriber data associated with said mobile station;

determining whether a purge flag for said mobile station is set within said home location register, said purge flag indicating whether said mobile station has been purged;

storing, by said home location register, an address for said gateway mobile location center in said subscriber data when said subscriber data has a purge flag set;

sending an unavailable notification to said gateway mobile location center; and setting, by said gateway mobile location, an unavailable flag for said mobile station based upon said unavailable notification to avoid sending additional routing requests for said mobile station to said home location register as long as said purge flag is set.

17. The method of claim 16, further comprising the steps of:

sending, by said home location register, an address for a mobile switching center serving said mobile station to said gateway mobile location center when said purge flag is not set; and sending, by said gateway mobile location center, said positioning request to said mobile switching center using said address.

18. The method of claim 17, further comprising the steps of:

sending, by said mobile switching center, a page to said mobile station based upon said positioning request;

setting an unresponsive flag in said mobile switching center when said mobile station does not respond to said page, said unresponsive flag preventing said mobile switching center from sending additional pages to said mobile station in response to additional positioning requests for said mobile station as long as said unresponsive flag is set;

storing said address for said gateway mobile location center;

sending said unavailable notification from said mobile switching center to said gateway mobile location center, said step of setting said unavailable flag being performed based upon said unavailable notification.

19. The method of claim 18, further comprising the steps of:

sending said positioning request from a location node to said gateway mobile location center, said positioning request including a notification request; and sending said unavailable notification to said location node based upon said notification request.

20. The method of claim 18, further comprising the steps of:

resetting, by said mobile switching center, said unresponsive flag when said mobile station engages in a communication;

sending an available notification from said mobile switching center to said gateway mobile location center using said stored address when said unresponsive flag is reset; and resetting, by said gateway mobile location center, said unavailable flag based upon said available notification.

21. The method of claim 16, further comprising the steps of:

resetting, by said home location register, said purge flag when said mobile station performs a location update;

sending an available notification from said home location register to said gateway mobile location center using said stored address when said purge flag is reset; and resetting, by said gateway mobile location center, said unavailable flag based upon said available notification.

22. The method of claim 21, further comprising the steps of:

sending said positioning request from a location node to said gateway mobile location center, said positioning request including a notification request; and sending, by said gateway mobile location center, said unavailable notification to said location node based upon said notification request.

23. A method for providing efficient signaling for a positioning request for a mobile station, comprising the steps of:

receiving said positioning request for said mobile station;

sending a page to said mobile station in response to said received positioning request;

setting an unresponsive flag indicating said mobile station is presently unresponsive to said page when said mobile station does not respond to said page, said unresponsive flag preventing additional pages from being sent to said mobile station in response to additional received positioning requests; and generating an unavailable message indicating said mobile station may not be positioned.

24. The method of claim 23, wherein said step of paging further comprises the steps of:

determining whether said unresponsive flag is set; and paging said mobile station only if said unresponsive flag is not set.

* * * * *